US011284775B2

(12) United States Patent
Arandigoyen Martínez et al.

(10) Patent No.: US 11,284,775 B2
(45) Date of Patent: Mar. 29, 2022

(54) DOMESTIC DISHWASHER COMPRISING A TANK ASSEMBLY

(71) Applicant: BSH Hausgeräte GmbH, Munich (DE)

(72) Inventors: Naiara Arandigoyen Martínez, Pamplona (ES); Pilar Balerdi Azpilicueta, Barindano (ES); Sergio Casado Carlino, Sarriguren (ES); Esther Castillo Bergad, Saragossa (ES); Vanesa Estremera Carrera, Pamplona (ES); Eloy Merino Alcaide, Sarriguren (ES); Gustavo Moliner Murillo, Estella (ES); Xabier Sagüés García, Pamplona (ES); Koldo Urdiain Yoldi, Ayegui (ES)

(73) Assignee: BSH Hausgeräte GmbH, Munich (DE)

( * ) Notice: Subject to any disclaimer, the term of this patent is extended or adjusted under 35 U.S.C. 154(b) by 177 days.

(21) Appl. No.: 16/635,173

(22) PCT Filed: Aug. 24, 2018

(86) PCT No.: PCT/IB2018/056418
§ 371 (c)(1),
(2) Date: Jan. 30, 2020

(87) PCT Pub. No.: WO2019/043532
PCT Pub. Date: Mar. 7, 2019

(65) Prior Publication Data
US 2020/0154975 A1  May 21, 2020

(30) Foreign Application Priority Data

Sep. 1, 2017  (ES) .............................. ES201731059

(51) Int. Cl.
*A47L 15/42* (2006.01)
*A47L 15/00* (2006.01)

(52) U.S. Cl.
CPC ....... *A47L 15/4291* (2013.01); *A47L 15/0023* (2013.01); *A47L 15/4214* (2013.01); *A47L 15/4285* (2013.01)

(58) Field of Classification Search
None
See application file for complete search history.

(56) References Cited

U.S. PATENT DOCUMENTS

| 10,722,100 B2 * | 7/2020 | Heinle ..................... A47L 15/46 |
| 2011/0114133 A1 | 5/2011 | Rosenbauer |
| 2018/0028042 A1 | 2/2018 | Heinle et al. |

FOREIGN PATENT DOCUMENTS

| DE | 19758061 A1 | 7/1999 |
| DE | 102013019185 A1 | 5/2015 |

(Continued)

OTHER PUBLICATIONS

National Search Report ES P201731059 dated Feb. 21, 2018.
International Search Report PCT/IB2018/056418 dated Nov. 12, 2018.

*Primary Examiner* — Rita P Adhlakha
(74) *Attorney, Agent, or Firm* — Michael E. Tschupp; Andre Pallapies; Brandon G. Braun (57) ABSTRACT

A household dishwasher includes a receiving area for receiving an item to be washed, and a tank assembly receiving dishwashing fluid. The tank assembly includes a first tank section with an inlet, via which the tank assembly can be supplied with dishwashing fluid, and a second tank section with an outlet, via which dishwashing fluid in the tank assembly is able to exit the tank assembly. The first and second tank sections are fluidically connected together and arranged fluidically in series such that dishwashing fluid in the first tank section is displaced into the second tank section when additional dishwashing fluid is introduced into the first tank section via the inlet.

13 Claims, 9 Drawing Sheets

(56) References Cited

FOREIGN PATENT DOCUMENTS

| EP | 2193741 | A2 | | 6/2010 | | |
|---|---|---|---|---|---|---|
| EP | 2684505 | A1 | | 1/2017 | | |
| SE | 1250552 | A1 | | 11/2013 | | |
| WO | WO-2016134938 | A1 | * | 9/2016 | ......... | A47L 15/4209 |

* cited by examiner

DOMESTIC DISHWASHER COMPRISING A TANK ASSEMBLY

CROSS-REFERENCES TO RELATED APPLICATIONS

This application is the U.S. National Stage of International Application No. PCT/IB2018/056418, filed Aug. 24, 2018, which designated the United States and has been published as International Publication No. WO 2019/043532 A1 and which claims the priority of Spanish Patent Application, Serial No. P201731059, filed Sep. 1, 2017, pursuant to 35 U.S.C. 119(a)-(d).

BACKGROUND OF THE INVENTION

The invention relates to a household dishwasher comprising a receiving area for receiving items to be washed and comprising a tank assembly for receiving dishwashing fluid.

A method for operating a corresponding household dishwasher is also disclosed.

Generic household dishwashers are known in the prior art and principally serve for the cleaning and subsequent drying of contaminated items to be washed, for example crockery or cutlery. During one or more cleaning steps, the dishwashing fluid (=water or water comprising detergent and/or rinse aid and/or contaminants) is applied to the items to be washed, in order to dissolve contaminants from the items to be washed. For drying the items to be washed, corresponding household dishwashers have a drying system for the cleaned items to be washed, in which air absorbs the water which adheres to the cleaned items to be washed and, as a result, dries the items to be washed.

It is also known to provide corresponding household dishwashers with a tank assembly in which dishwashing fluid may be received (wherein fresh water is also denoted hereinafter as dishwashing fluid). The tank assembly serves, for example, for the temporary storage of the dishwashing fluid in order to heat said dishwashing fluid to the temperature of the surroundings of the household dishwasher and thus in order to save energy. It is also known to fill the tank assembly with cold fresh water during a drying step of the washing program in order to provide a cold source.

BRIEF SUMMARY OF THE INVENTION

It is the object of the present invention to develop a generic household dishwasher and to propose a method for operating said household dishwasher.

The object is achieved by a household dishwasher and a method having the features of the independent claims.

The household dishwasher is characterized in that the tank assembly comprises at least one first tank section with an inlet, via which the tank assembly can be supplied with dishwashing fluid. The inlet may be, for example, an opening, a connector for a pipe or a hose or a hose section or pipe section which is connected to the tank assembly.

In any case, the inlet should be fluidically connected to a fresh water supply line (which is connected to a fresh water mains supply) and/or fluidically connected to the receiving area or a pump sump of the household dishwasher. Thus the tank assembly and/or the first tank section thereof may be supplied with dishwashing fluid via the inlet.

It is further provided that the tank assembly comprises at least one second tank section with an outlet, via which dishwashing fluid present in the tank assembly can exit the tank assembly. The outlet may be an opening, a connector for a pipe or a hose or a hose section or pipe section which is connected to the tank assembly. The outlet is also fluidically connected to the receiving area or the aforementioned pump sump, so that dishwashing fluid present in the tank assembly may be drained into the receiving area and/or the pump sump.

In particular, it is advantageous if a valve is integrated in the line which runs between the outlet and the receiving area and/or the pump sump, said valve being able to be moved at least between an open position and a closed position by means of a control unit and/or regulating unit of the household dishwasher. Preferably, the valve is able to be regulated in a stepless manner or in a plurality of steps, so that the volumetric flow of the dishwashing fluid which passes through the valve may be adapted (preferably according to the progress of a washing program).

Thus the second tank section may be emptied by opening the valve, wherein in this connection it is advantageous if the tank assembly, in particular the second tank section, has a pressure compensation opening or an air valve, via which air may flow into the second tank section when this tank section is entirely or partially emptied via the outlet.

The first and the second tank section in each case also represent a cavity which is surrounded and/or defined by one or more walls of the tank assembly. In other words, therefore, the tank assembly comprises at least two cavities and/or chambers in the form of the two aforementioned tank sections which both serve for receiving dishwashing fluid. The tank assembly according to the invention, therefore, comprises a multi-chamber tank which comprises two or more chambers.

The tank assembly thus comprises at least two tank sections which are also fluidically connected together. In particular, both tank sections are arranged fluidically in series. This means that when dishwashing fluid is to flow from the inlet of the tank assembly into the second tank section, it initially has to pass forcibly through the first tank section. Thus dishwashing fluid present in the first tank section is displaced into the second tank section when dishwashing fluid is introduced into the first tank section via the inlet. Thus it is only possible to fill the second tank section by the first tank section being filled with dishwashing fluid until said dishwashing fluid overflows into the second tank section. If the first tank section is filled with dishwashing fluid to a maximum level which is dictated by the construction thereof, when further dishwashing fluid flows into the first tank section the quantity of dishwashing fluid which flows into the first tank section via the inlet is displaced into the second tank section.

The advantage herein, therefore, is that both tank sections may be filled with dishwashing fluid via a single inlet, wherein the two tank sections, as described in more detail hereinafter, are positioned at different points of the household dishwasher. By filling only the first or both tank sections, therefore, it is possible to specify in which regions of the household dishwasher heat is discharged to the dishwashing fluid located in the respective tank section and/or in which regions heat is removed from the dishwashing fluid.

The first tank section is also filled by a pump being activated, said pump moving dishwashing fluid in the direction of the inlet, or by a valve being opened, said valve being located in the line which feeds into the inlet and being fluidically connected to a fresh water supply line or the pump sump or the receiving area.

Both tank sections are preferably connected together via a fluid line in the form of a pipe or a hose.

Preferably, the two tank sections are arranged in the region of a lateral wall and are located outside the receiving area.

The tank assembly is preferably configured as a two-chamber tank. The second tank section and/or the second chamber is preferably arranged between a wall of the washing container, in particular a side wall of the washing container, and the first tank section and/or the first chamber. The first tank section is thus attached externally to the wall of the washing container, whilst the second tank section is attached internally to the wall of the washing container. The second tank section in this case may preferably be in direct contact with the wall or may be arranged on a support layer potentially attached externally thereto, in particular a damping layer, such as for example a bitumen pad which dampens the receiving area outwardly relative to the discharge/emission of noise.

According to an advantageous development, the household dishwasher comprises a heat pump arrangement, a heat transfer medium flowing therethrough during the operation thereof, wherein the heat pump arrangement comprises, amongst other things, an evaporator, heat being able to be transferred thereby from the dishwashing fluid to the heat transfer medium.

The heat pump arrangement principally comprises a heat exchanger acting as an evaporator for evaporating a heat transfer medium and a compressor for compressing the evaporated heat transfer medium. During the operation of the heat pump arrangement, the gaseous heat transfer medium entering the compressor is compressed by means of the compressor, wherein said heat transfer medium is heated up.

Moreover, the heat pump arrangement comprises a heat exchanger acting as a condenser in which the heated gaseous heat transfer medium is condensed again and at the same time discharges heat which may be used, for example, for heating dishwashing fluid present in the household dishwasher. Subsequently, the condensed heat transfer medium is depressurized by means of an expansion member (generally a throttle valve or a capillary tube) and finally passes back again to the evaporator in which it is transferred back into the gaseous state by the absorption of heat and then supplied again to the compressor.

It is advantageous, therefore, if the evaporator is at least partially arranged inside the first tank section or is in thermally conductive contact therewith. The evaporator is configured, for example, as a tubular heat exchanger or plate heat exchanger. Preferably, the first tank section is additionally arranged remotely from the receiving area and/or the walls defining the receiving area, such that heat may not be directly transferred from the first tank section into the receiving area. The walls of the tank assembly defining the first tank section are thus preferably spaced apart from the walls defining the receiving area. If the heat pump arrangement is now operated, heat is removed from the dishwashing fluid located in the first tank section, said heat being absorbed by the evaporator. It is ensured by the aforementioned arrangement of the first tank section that no heat or only very little heat is transferred from the receiving area into the first tank section. Thus the receiving area and/or the dishwashing fluid circulating therein is not significantly cooled if the heat pump arrangement is operated.

According to an advantageous development, the second tank section is at least partially, preferably entirely, arranged between the first tank section and the receiving area. If the second tank section is not filled with dishwashing fluid, this second tank section acts as insulation since in this case it is exclusively filled with air. Thus the second tank section is preferably emptied before or during the stages in which the dishwashing fluid circulating in the receiving area is to be heated and in which the heat pump arrangement is operated. By the insulating action of the empty second tank section, a removal of heat from the receiving area into the first tank section and/or the dishwashing fluid contained therein and cooled by the evaporator is virtually eliminated if the second tank section is empty.

Preferably, the first and/or second tank section has a cuboidal shape. In particular, a thickness of the respective tank section, running perpendicular to the adjacent wall defining the receiving area, should be many times smaller than its height and/or width running parallel to the aforementioned wall.

According to an advantageous development, a wall of the tank assembly defining the second tank section bears directly against a side, remote from the receiving area, of at least one wall defining the receiving area or against a damping layer in contact with the aforementioned wall. It is also conceivable that the aforementioned wall is formed entirely or partially by the aforementioned wall of the tank assembly. In this case, dishwashing fluid present in the second tank section may serve for cooling the steam present in the receiving area. As a result, a drying step of a washing program, in which condensation of the aforementioned steam is desired, may be actively assisted. In particular, the second tank section should be filled with cold dishwashing fluid during or shortly before a drying step.

In particular, this is possible by the heat pump arrangement being operated before the drying step, in particular during a cleaning step and/or rinse aid step, wherein the second tank section is empty during this period of time. The dishwashing fluid located in the first tank section is cooled by the absorption of heat by the evaporator. If shortly before or during the drying step dishwashing fluid is introduced via the inlet into the first tank section, the dishwashing fluid which is already located in the first tank section and which is very cold (possibly partially frozen) is displaced into the second tank section. If the outlet of the tank assembly is closed at this time, the second tank section is gradually filled with cold dishwashing fluid as far as a defined filling height. The dishwashing fluid in the second tank section may now absorb heat from the receiving area and thus assist and/or effect the condensation of the steam located therein.

According to an advantageous development, the first tank section and the second tank section are arranged on the same side of the receiving area (and outside thereof). The arrangement of one or both tank sections in the region of a bottom wall is also conceivable. Similarly, the first tank section may be arranged on a first side of the receiving area and the second tank section may be arranged on a second side of the receiving area.

According to an advantageous development, the first tank section and the second tank section are fluidically connected together via a connection, wherein dishwashing fluid may flow via the connection from the first tank section into the second tank section. The connection may be one or more pipes and/or hoses.

According to an advantageous development, the connection is arranged higher in the vertical direction than the inlet of the first tank section and/or the outlet of the second tank section. Preferably, the inlet is arranged in the lower third (viewed in the vertical direction) of the first tank section so that the first tank section may be filled from below with dishwashing fluid. Moreover, the outlet of the second tank section is preferably arranged in the lower third of the second tank section so that the second tank section is emptied by gravity when the flow path from the outlet into the receiving area and/or the pump sump is not blocked by a valve. Finally, it is advantageous if the connection, via which the first and the second tank section are connected together, is arranged above the inlet and also above the outlet. Preferably, the connection is located in the upper third of the first and/or the second tank section.

The flow path inside the tank assembly is thus preferably configured such that the dishwashing fluid, which flows in via the inlet, initially flows upwardly in the vertical direction, is displaced into the second tank section in the upper region and initially has to flow downwardly therein before it is able to exit the tank assembly via the outlet.

According to an advantageous development, the first tank section and the second tank section are partially defined by a common wall. Both tank sections are thus formed by a common container which is divided into two sections in the interior by one or more walls, wherein the sections are naturally also in this case fluidically connected together via a connection. The connection may be an opening and/or through-passage in the aforementioned wall and which is preferably arranged in the upper third of the first and/or second tank section.

Generally at this point it should be mentioned that the tank sections according to the invention may also be fluidically connected together by more than one connection, more than two tank sections also being able to be present.

According to an advantageous development, the first tank section and/or the second tank section has a pressure compensation opening via which air may flow into the respective tank section. If the second tank section is emptied via the outlet, air may flow back into the second tank section. The pressure compensation opening may be present, for example, as a through-passage of a wall of the tank assembly in an upper region of the first or second tank section or may be part of an air valve.

The method according to the invention for operating a household dishwasher is characterized in that the second tank section is supplied with dishwashing fluid during the defined stages of a washing program, by dishwashing fluid present in the first tank section being displaced by further dishwashing fluid which flows via the inlet into the first tank section, wherein the dishwashing fluid displaced from the first tank section flows into the second tank section. The household dishwasher may also have one or more of the features described above or below.

In any case, the second tank section is indirectly filled by the first tank section being filled with dishwashing fluid and by dishwashing fluid which is already present in the first tank section being displaced thereby, said dishwashing fluid passing into the second tank section via the aforementioned connection.

The second tank section is emptied directly via the outlet, however, wherein once the dishwashing fluid is located in the second tank section it no longer flows back into the first tank section. However, after leaving the tank assembly the dishwashing fluid may enter the first tank section again via the outlet. This is carried out, for example, by the dishwashing fluid, which has flowed via the outlet into the pump sump or the receiving area, being pumped again into the first tank section.

Thus the second tank section may be preferably exclusively filled with dishwashing fluid via the first tank section. Moreover, the first tank section is preferably always filled with dishwashing fluid, wherein this dishwashing fluid is displaced into the second tank section when further dishwashing fluid flows into the first tank section via the inlet and thus into the tank assembly (for example by means of a pump or by opening a valve which is located between a fresh water connector of the household dishwasher and the inlet of the tank assembly).

According to an advantageous development, during one or more stages of the washing program in which the dishwashing fluid is heated, the second tank section is at least temporarily only partially filled or not filled with dishwashing fluid. The second tank section is preferably located in this case between the first tank section and the receiving area. If the second tank section is not filled or only partially filled with dishwashing fluid, it acts as an insulator between the first tank section and the receiving area. Preferably, in this case the dishwashing fluid is cooled in the first tank section by means of an evaporator of a heat pump arrangement of the household dishwasher.

Preferably, therefore, during a cleaning step or rinse-aid step the first tank section is at least temporarily filled with dishwashing fluid, whilst during one or both of the aforementioned steps the second tank section is (at least temporarily) not filled or only partially filled with dishwashing fluid.

According to an advantageous development, during one or more stages of the washing program, in which the items to be washed are dried (drying step), the second tank section is at least temporarily entirely or partially filled with dishwashing fluid. Preferably, during the drying step or during the step of the washing program prior to the drying step, the dishwashing fluid is displaced from the first tank section into the second tank section. Moreover, it is expedient if the dishwashing fluid present in the first tank section is cooled during the drying step or in the step prior to the drying step. Preferably, the cooling takes place by the household dishwasher comprising a heat pump arrangement with an evaporator, wherein the heat pump arrangement is operated in the period of time in which it is desired to cool the dishwashing fluid in the first tank section. This is the case, for example, when it is desired to heat the dishwashing fluid by means of the condenser of the heat pump arrangement of the heat pump circuit, such as for example during the cleaning step and/or rinse-aid step, and the first tank section filled with dishwashing fluid serves as heat source for the heat pump circuit. The evaporator in this case is integrated in the first tank section or is in thermally conductive contact therewith and/or one or more walls defining the first tank section.

According to an advantageous development, during the emptying of the second tank section, dishwashing fluid flowing out of the second tank section flows into the receiving area or a pump sump of the household dishwasher. The dishwashing fluid may finally be conveyed to one or more spray devices, in particular rotatable spray arms, the dishwashing fluid being sprayed thereby onto the items to be washed. The dishwashing fluid may also be conveyed back into the first tank section.

According to an advantageous development, at the end of a washing program both the first and the second tank section are filled with dishwashing fluid. In this case, the dishwashing fluid may be heated to room temperature before a further washing program is started. Finally, at the start of a new washing program the second tank section is initially emptied into the receiving area or the pump sump. At the same time, or thereafter, fresh water may be introduced into the first tank section via the inlet. As a result, dishwashing fluid is displaced out of the first tank section into the second tank section and finally also passes into the receiving area or the pump sump.

BRIEF DESCRIPTION OF THE DRAWINGS

The invention and its advantageous embodiments and developments and the advantages thereof are described in more detail hereinafter with reference to the drawings. In the drawings, in each case in a schematic basic sketch.

DETAILED DESCRIPTION OF EXEMPLARY EMBODIMENTS OF THE PRESENT INVENTION

Figure 1:
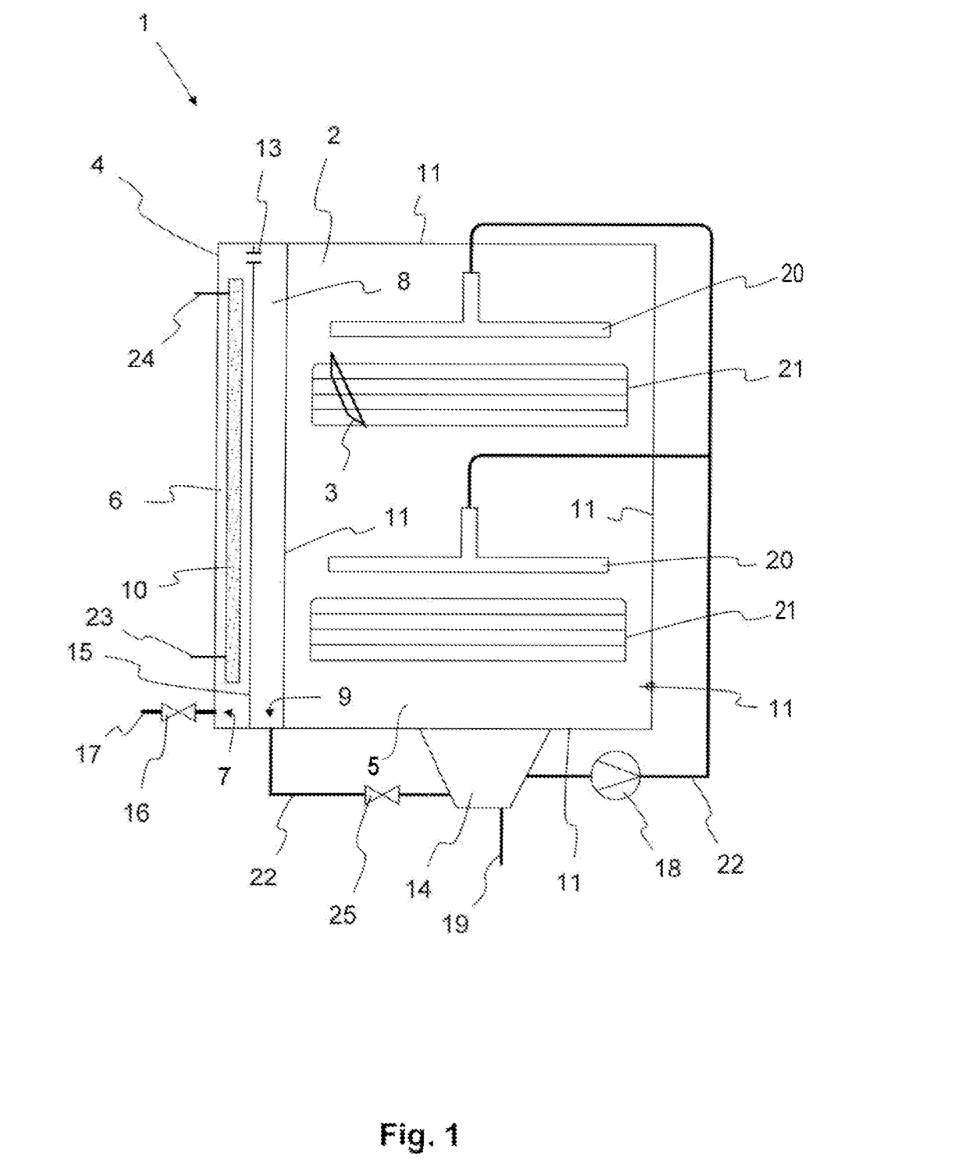
FIG. 1 shows selected sections of a household dishwasher according to the invention.

The household dishwasher 1 according to the invention comprises a plurality of walls 11 (in the form of side walls, a rear wall, a ceiling wall and a bottom wall) of a washing container, which define an internal receiving area 2 which in turn serves for receiving items to be washed 3. Moreover, the household dishwasher 1 comprises a door and optionally a housing surrounding the sections and/or walls shown (neither are shown). In particular at least one damping layer, such as for example a bitumen pad for noise reduction, and/or at least one other support layer, such as for example a thermally insulating layer, may be applied externally to the respective wall of the washing container.

For receiving the items to be washed 3 in the receiving area 2, for example, one or more crockery baskets 21 are present. Moreover, a spray arrangement having one or more spray devices, in particular one or more preferably rotatably mounted spray arms 20, is present, dishwashing fluid 5 (i.e. water or water mixed with detergent and/or rinse aid and/or contaminants) being able to be applied thereby onto the items to be washed 3, for example during a cleaning step or rinse aid step of a washing program. In addition or independently thereof, further spray devices may also be provided.

For the supply of fresh water the household dishwasher 1 is connected to a fresh water mains supply, not shown, via a fresh water supply line 17, wherein a fresh water valve 16 is integrated in the fresh water supply line 17 in order to be able to influence the supply of fresh water. A drain 19 is also present, via which the household dishwasher 1 is connected to a waste water system, not shown, and via which contaminated dishwashing fluid 5 may be discharged from a pump sump 14 of the household dishwasher 1 arranged in the region of the lower wall 11.

Before the dishwashing fluid 5 is removed via the outlet 9, however, it is generally initially guided repeatedly in the circuit and applied to the items to be washed via the spray arrangement in order to release contaminants. To this end, the household dishwasher 1 comprises a circulating pump 18 which is integrated in a line 22 which extends from the pump sump 14 to the spray arrangement.

It may also be derived from FIG. 1 that the household dishwasher 1 comprises a tank assembly 4 which serves for receiving dishwashing fluid 5. The tank assembly 4 has a first tank section 6 and a second tank section 8, wherein the two tank sections 6, 8 are fluidically connected together by a connection 13. The connection 13 may be, for example, a pipe or a hose or, as shown, a through-passage inside a wall 15 of the tank assembly 4 which separates the two tank sections 6, 8. The tank assembly 4 is preferably configured in this case as a two-chamber tank. The second tank section and/or the second chamber 8 is preferably arranged between a wall of the washing container, in particular a side wall of the washing container, and the first tank section and/or the first chamber 6. The first tank section 6 is thus attached externally, whilst the second tank section 8 is attached internally, to a wall 11 of the washing container. The second tank section 8 in this case may preferably be in direct contact with the wall 11 or may be arranged on a support layer attached externally thereto, in particular a damping layer, such as for example a bitumen pad which dampens the receiving area 2 toward the outside relative to the discharge/emission of noise.

The tank assembly 4 comprises an inlet 7 via which fresh water is able to be introduced into the external first tank section 6 of the tank assembly 4 when the fresh water valve 16 is opened. In this case, the fresh water, i.e. dishwashing fluid 5, flows upwardly in the first tank section 6. If said dishwashing fluid reaches the connection 13 when further dishwashing fluid 5 flows in via the inlet 7, it is displaced via the connection 13 into the second tank section 8. The second tank section 8 is thus not directly filled with dishwashing fluid 5 but via the first tank section 6.

In contrast thereto, the emptying of the second tank section 8 takes place directly via the outlet 9 of the tank assembly 4 which is located in the lower region of the second tank section 8. Preferably, the tank assembly 4 has a pressure compensation opening 27, not shown in FIG. 1, via which air may flow back into the second tank section 8 when this second tank section is emptied via the outlet 9.

In any case, therefore, the filling state inside the second tank section 8 may be influenced by the quantity of dishwashing fluid 5 which flows in via the inlet 7 and/or flows out via the outlet 9 of the tank assembly 4. The volumetric flow of the dishwashing fluid 5 flowing out via the outlet 9 may be regulated via an outlet valve 25 which may be located in a line 22 between the outlet 9 and the pump sump 14.

This arrangement has particular advantages, therefore, when an evaporator 10 of a heat pump arrangement of the household dishwasher 1 is integrated in the first tank section 6 (alternatively said evaporator could also be in thermally conductive contact with the first tank section 6 and could be located outside said first tank section). The remaining components of the heat pump arrangement (such as for example the compressor, the condenser and the expansion member which have been already described in the above description) are not shown for reasons of clarity. These components, however, are fluidically connected to the evaporator 10 via a heat transfer medium inlet 23 and a heat transfer medium outlet 24.

The heat transfer between the receiving area 2 and thus the dishwashing fluid 5 circulating therein and the first tank section 6 and thus the evaporator 10 may be regulated by the quantity of dishwashing fluid 5 in the second tank section 8. If during the operation of the heat pump arrangement the second tank section 8 is filled with dishwashing fluid 5, heat may be discharged from the receiving area 2 via the dishwashing fluid 5 in the two tank sections 6, 8 to the evaporator 10 and/or the heat transfer medium flowing through the evaporator 10. If the second tank section 8 is empty, however, this acts as a thermal insulator. In this case, an operation of the heat pump arrangement only effects a cooling and/or partial freezing of the dishwashing fluid 5 present in the first tank section 6. When the second tank section 8 is only partially filled with dishwashing fluid from the first tank section, the thermal coupling between the wall 11 provided externally with the tank assembly 4 and the first tank section 6 only increases in the section of the second tank section 8 in which the dishwashing fluid is located, whilst in the section of the second tank section 8 which is filled with air, i.e. remains empty of fluid, a thermal insulation between the wall 11 and the first tank section 6 is maintained as before.

Expressed in general terms, i.e. unconnected to the present exemplary embodiment, the transfer of heat and/or heat transfer between the receiving area of the washing container and the first tank section may be adjusted and/or regulated by the extent to which the second tank section is filled with the dishwashing fluid from the first tank section. (The outlet of the second tank section in this case is preferably closed).

In an operating phase of the heat pump arrangement in which dishwashing fluid is heated by means of the condenser thereof for use in the receiving area, such as for example during the cleaning step and/or rinse aid step, it is thus advantageous if the second tank section is completely empty, i.e. entirely filled with air. Then a thermal barrier and/or insulation is provided between the receiving area of the washing container and the first tank section which is thermally coupled to the evaporator or in which the evaporator is arranged. As a result, during the respective operating phase of the heat pump arrangement in which dishwashing fluid is heated by means of the condenser thereof for use in the receiving area, such as for example in the cleaning step and/or rinse aid step, heat losses from the receiving area into the dishwashing fluid of the first tank section are substantially avoided.

For the drying step completing the dishwashing program, however, the second tank section is entirely filled with the dishwashing fluid from the first tank section by a corresponding quantity of fresh water being let into the first tank section. This inlet water displaces a correspondingly large quantity of dishwashing fluid which was already present in the first tank section so that said dishwashing fluid runs, in particular overflows, into the second tank section. Since the dishwashing fluid running, in particular overflowing, into said second tank section has been cooled down by the evaporator of the heat pump arrangement relative to the original water inlet temperature and/or ambient temperature, by the operation of the heat pump arrangement during a previous partial washing step and/or washing stage, to which the heated dishwashing fluid in the washing container is intended to be allocated, the wall of the washing container which is in contact with the second tank section may be made cold relative to the air/steam mixture in the receiving area during the drying process, which promotes the condensation of moisture from the air/steam mixture on this wall. In this case, by filling the second tank section entirely with cold dishwashing liquid from the first tank section, a thermal heat conduction may be produced relative to the first tank section filled up with dishwashing fluid. As a result, the entire quantity of cold dishwashing fluid of both tank sections is available for cooling the wall during the drying step of the dishwashing program to be carried out.

In an operating phase of the heat pump arrangement in which by means of the condenser thereof dishwashing fluid is heated up for use in the receiving area, such as for example during the cleaning step and/or rinse aid step, if the quantity of dishwashing fluid in the first tank section is cooled below a predetermined temperature threshold by the evaporator which is in thermally conductive contact therewith, it may be advantageous to refill fresh water from a fresh water line into the first tank section, whereby a partial quantity of dishwashing fluid is forced from the first tank section into the second tank section and is stored there with the dishwashing fluid to be heated up for the washing step. Then the first tank section is preferably filled entirely with dishwashing fluid and the second tank section is, in particular, only partially filled with dishwashing fluid. For the dishwashing fluid in the first tank section a mixing temperature prevails which is higher than its temperature before the refilling with fresh water. In this manner, the total quantity of dishwashing fluid from which the evaporator may draw off thermal energy may be increased.

FIGS. 4 to 9 which are described in more detail below show one possible washing mode.

Figure 2:
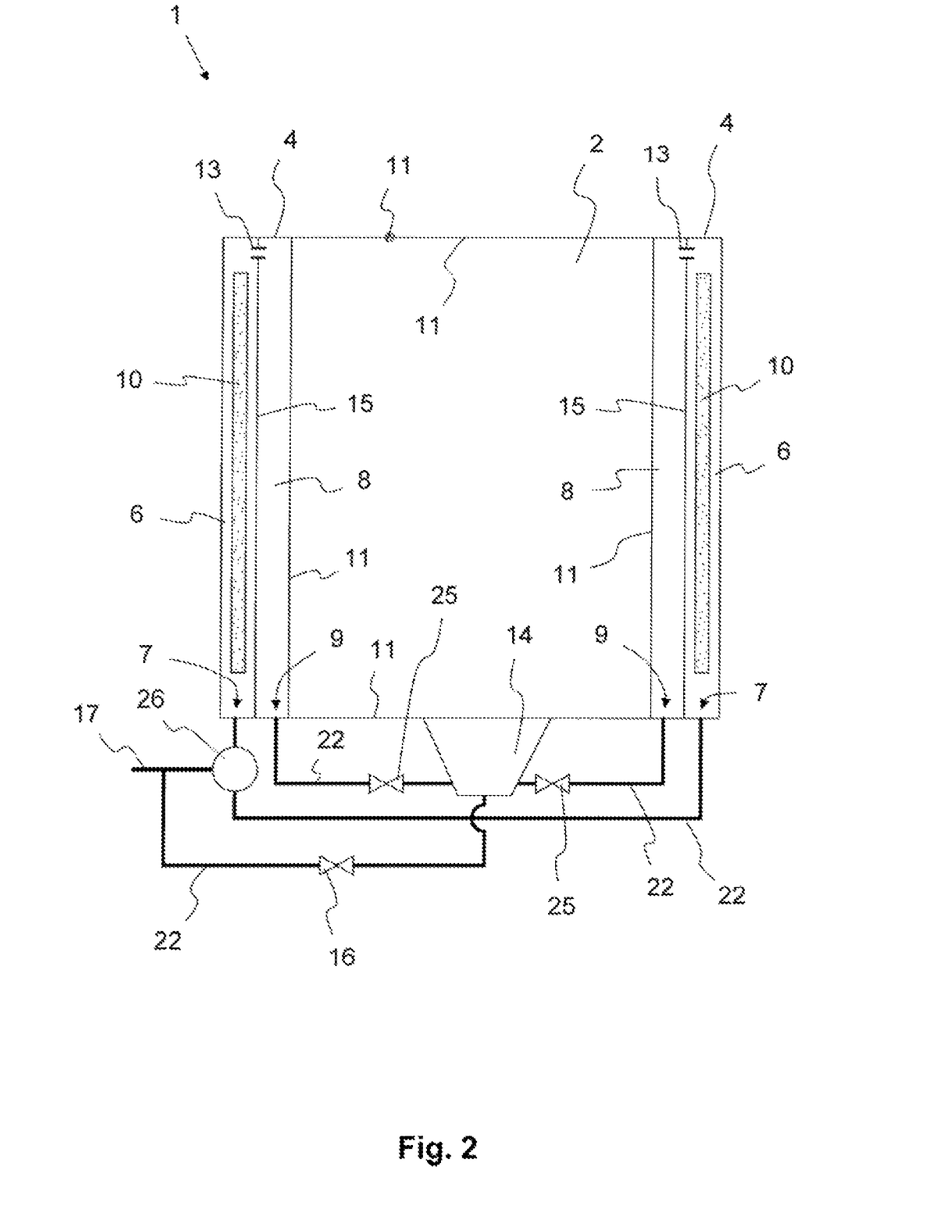
FIG. 2 shows selected sections of a further embodiment of a household dishwasher according to the invention.

FIG. 2 shows that the household dishwasher 1 may also have more than just one tank assembly 4. It is conceivable to arrange a corresponding tank assembly 4, for example, in each case in the region of the two lateral walls 11. In order to fill the respective first tank sections 6 with dishwashing fluid 5, preferably a multi-way valve 26 (for example a four-way valve) which connects the fresh water supply line 17 with the two first tank sections 6 is provided. The multi-way valve 26 may have, for example, the positions "fully closed", "fully open" (both first tank sections 6 are filled with fresh water) or "partially open" (only the left-hand or only the right-hand first tank section 6 is filled with fresh water).

Moreover, a separate line 22, which branches off upstream of the multi-way valve 26 from the fresh water supply line 17 and feeds into the pump sump 14, may be present in order to be able to fill the household dishwasher 1 independently of the tank assembly 4 with fresh water.

Figure 3:
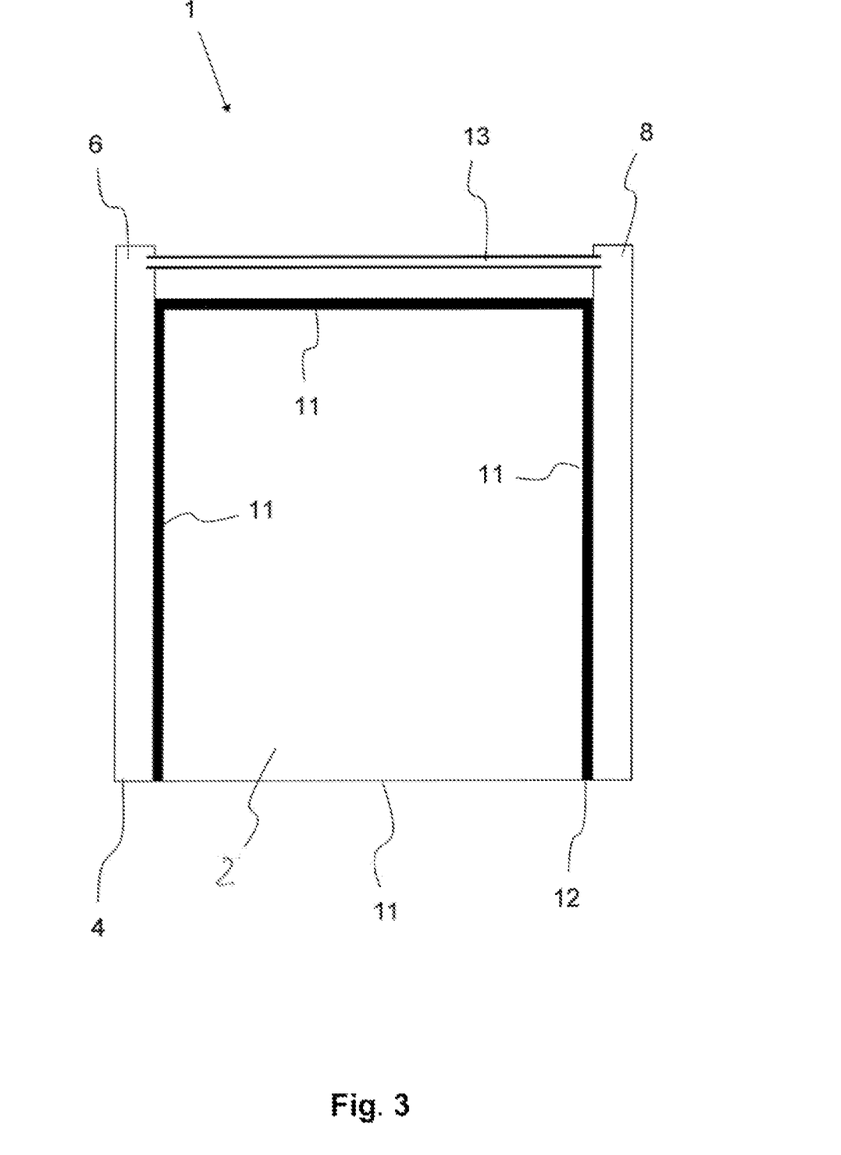
FIG. 3 shows selected sections of a further embodiment of a household dishwasher according to the invention.
Figure 4:
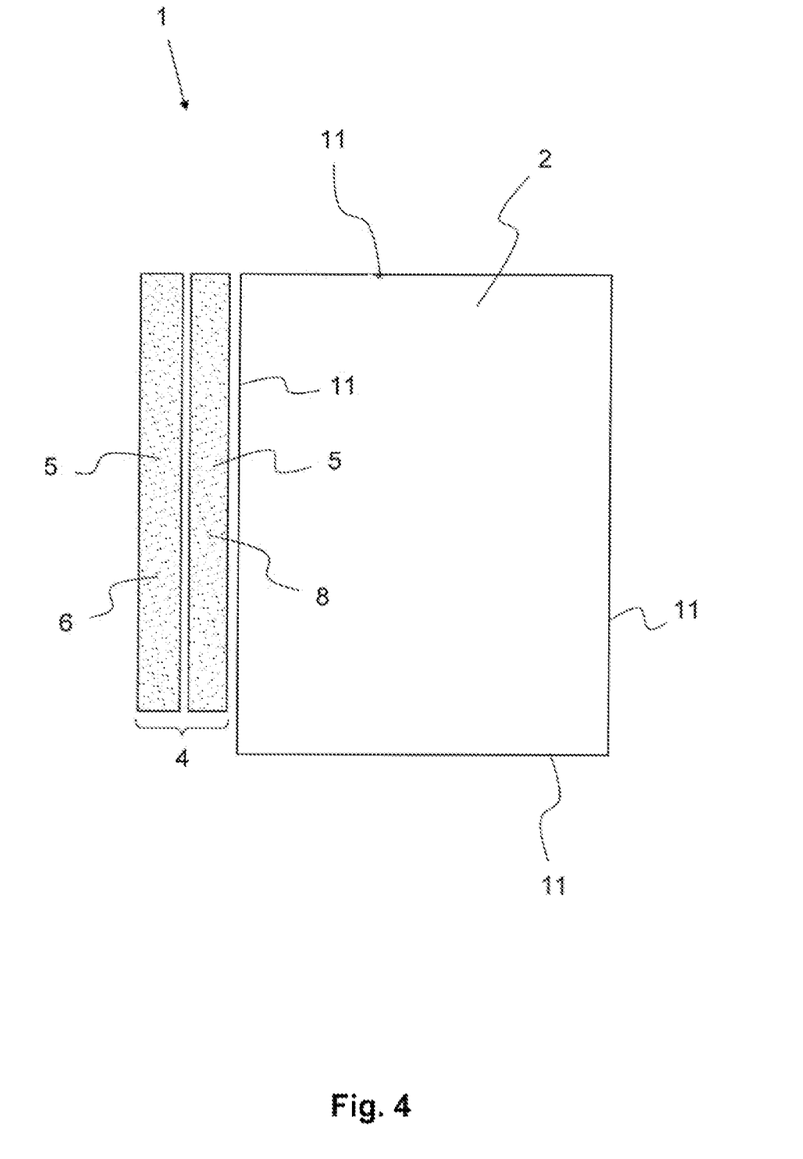
FIGS. 4 to 9 show selected sections of a further embodiment of a household dishwasher according to the invention during different stages of a washing program.

FIG. 3 shows that the two tank sections 6, 8 do not necessarily have to be separated from one another by a common wall 15. Instead, the two tank sections 6, 8 may also be arranged in the region of different walls 11. The connection 13 of the tank sections 6, 8 in this case is implemented via one or more pipes or hoses. Additionally, it is possible that one or both tank assemblies 4 are not directly arranged on a wall 11 but on a damping layer 12 attached externally thereto, such as for example a bitumen pad which dampens the receiving area 2 externally relative to the discharge/emission of noise.

Finally a sequence which could be implemented in a possible washing program is shown in FIGS. 4 to 9, wherein only the essential stages are shown in order to ensure a clear overview.

At the start of the washing program (FIG. 4) both tank sections 6, 8 are filled with dishwashing fluid 5 which has been filled into the tank assembly 4 at the end of the previous washing program and is now approximately at ambient temperature.

Figure 5:
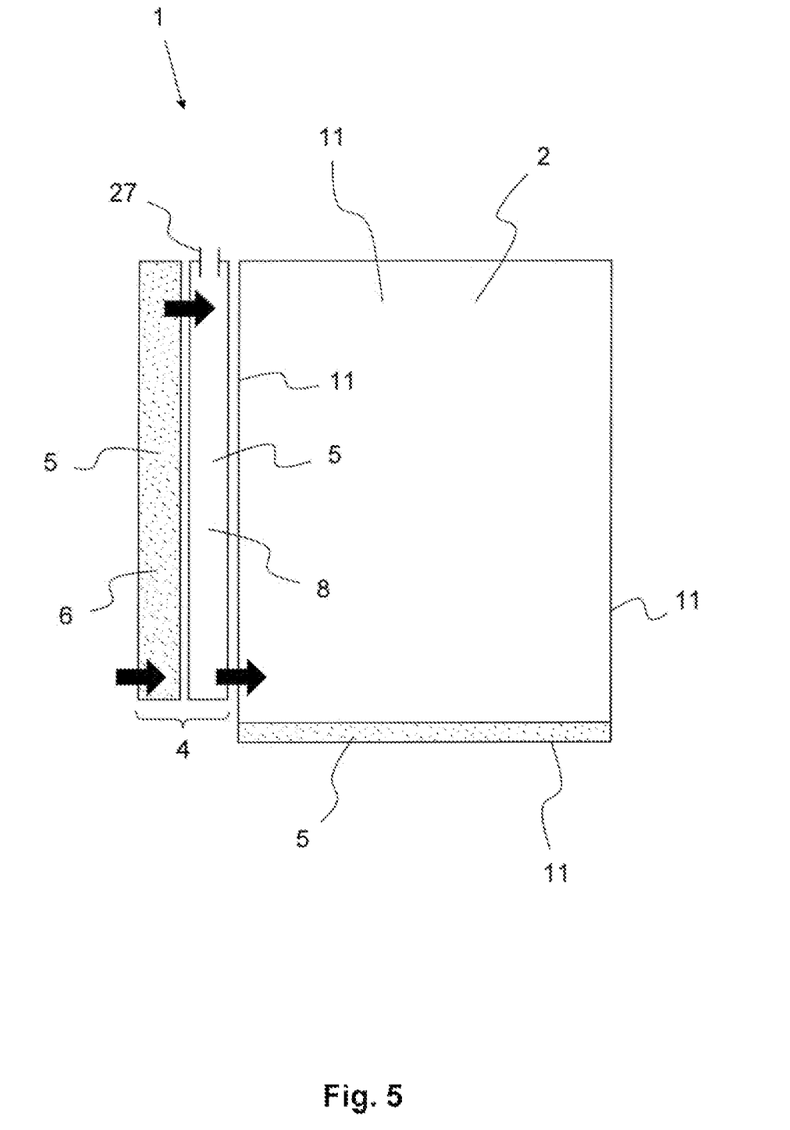

In the first step the dishwashing fluid 5 is drained out of the second tank section 8 into the receiving area 2 or the pump sump 14 (FIG. 5). At the same time, fresh water flows into the first tank section 6 and thereby displaces dishwashing fluid 5 from the first tank section 6 into the second tank section 8, which also flows into the receiving area 2 or the pump sump 14. As a result, dishwashing fluid 5 (FIGS. 5 and 6), which is required for the following cleaning step, collects in the interior of the receiving area 2 and/or in the pump sump 14.

Flowing dishwashing fluid 5 is identified in FIGS. 5 to 9 by thick black arrows. Additionally a pressure compensation opening 27 is shown (exclusively) in FIG. 5, via which air may flow into the tank assembly 4 when the second tank section 8 is emptied.

Finally the heat pump arrangement is operated (FIG. 6) in order to heat the dishwashing fluid 5 present in the pump sump 14 and/or in the receiving area 2 for the cleaning step, wherein a transfer of heat from the receiving area 2 and/or the dishwashing fluid 5 already circulating therein to the evaporator 10 is prevented and/or minimized by the second tank section 8 being empty and thus acting as a thermal insulator. The supply of dishwashing fluid 5 into the first tank section 6 is naturally stopped when sufficient dishwashing fluid 5 is present in the receiving area 2 and/or in the pump sump 14.

Figure 6:
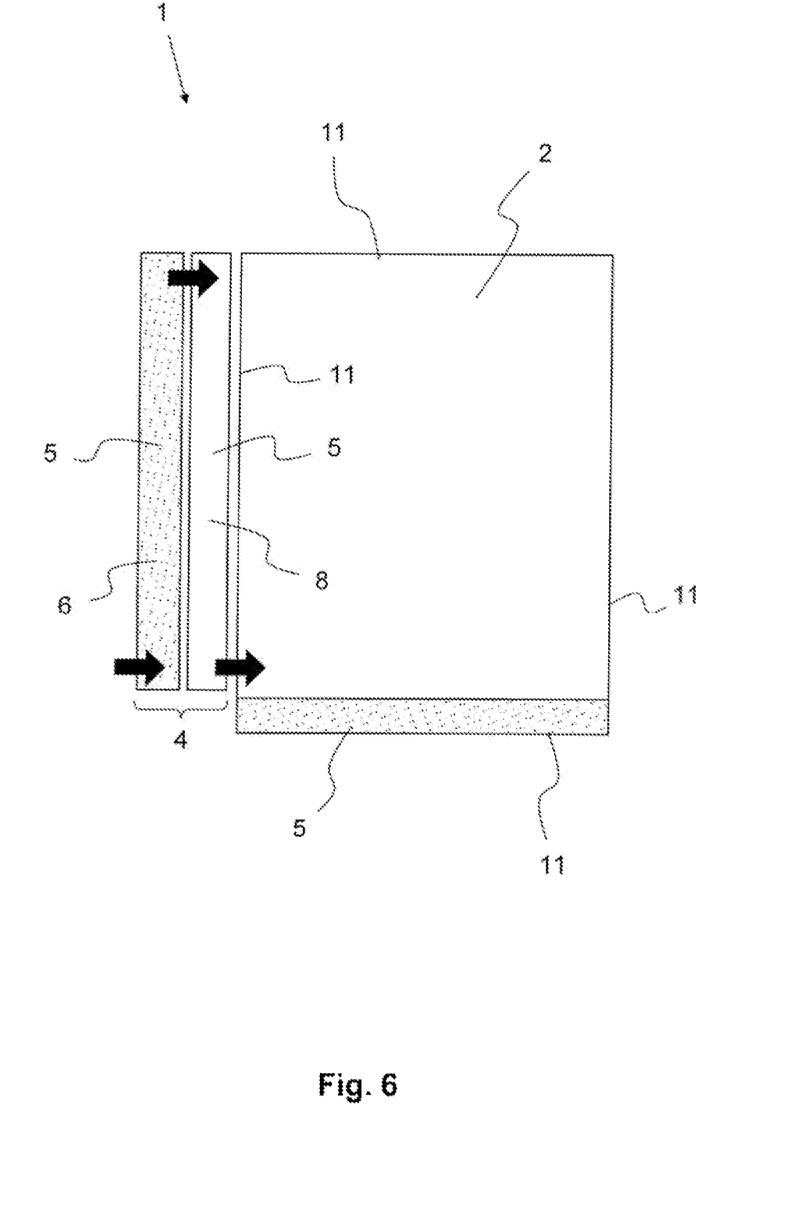

With further operation of the heat pump arrangement the dishwashing fluid 5 in the first tank section 6 is cooled and may also partially freeze. The second tank section 8 thus serves as a cold reservoir and/or for storing cold.

Figure 7:
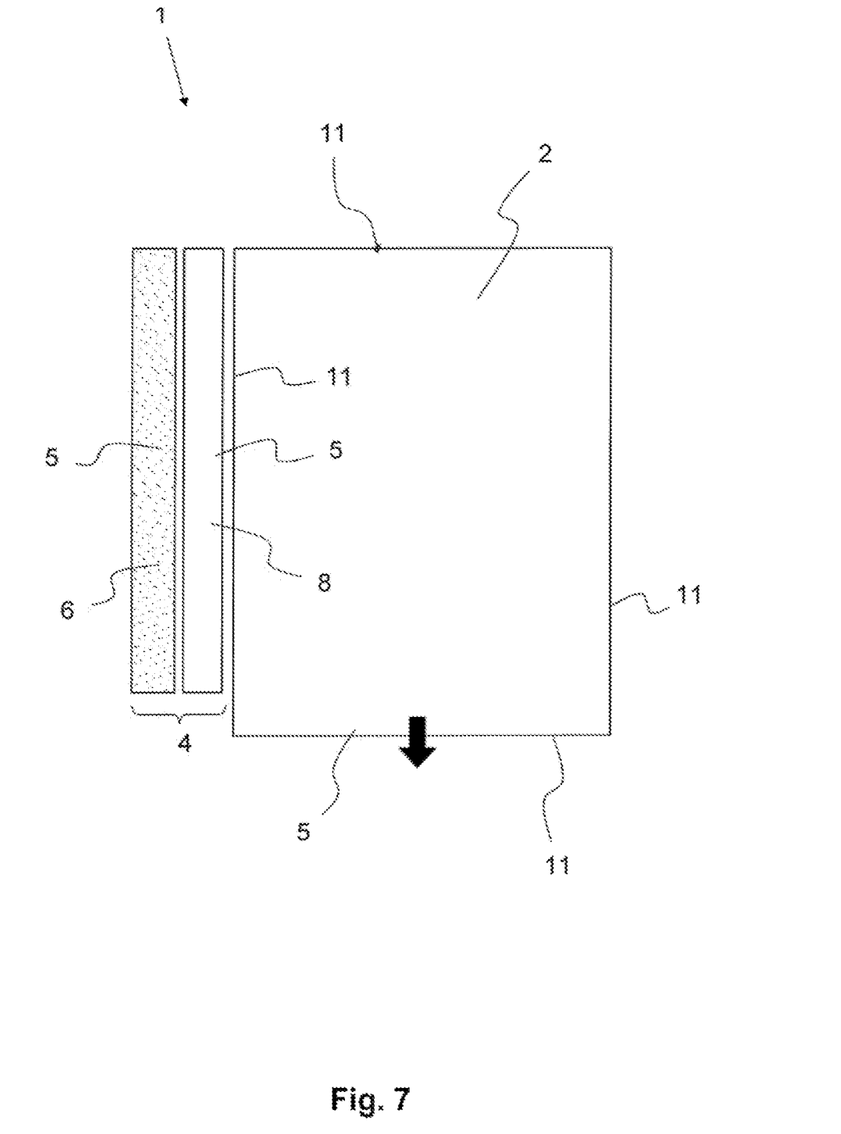

In the next step the dishwashing fluid 5 is drained out of the receiving area 2 and/or the pump sump 14 (FIG. 7).

Figure 8:
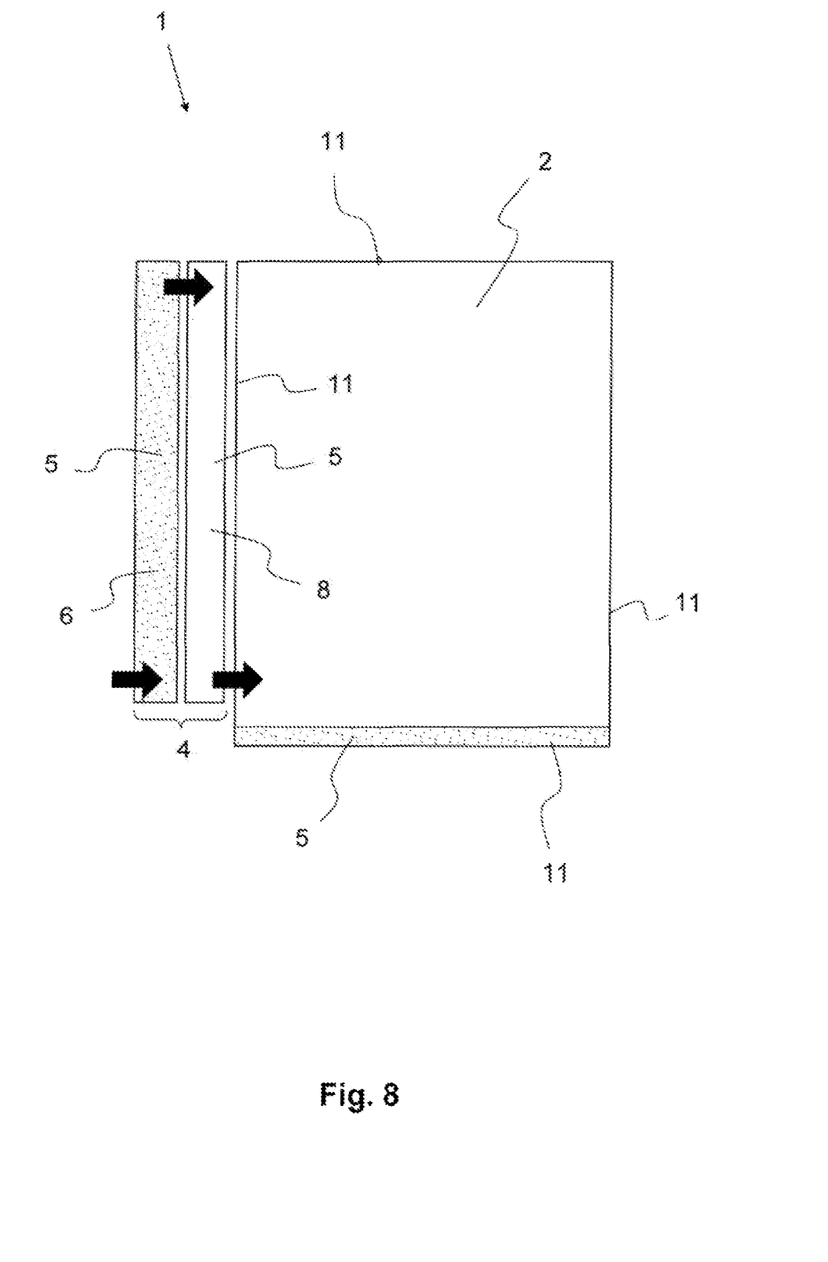

For the following rinse aid step, however, once again a certain quantity of dishwashing fluid 5 is required inside the receiving area 2 and/or the pump sump 14. By the addition of fresh water into the first tank section 6 this dishwashing fluid 5 is once again filled into the receiving area 2 and/or the pump sump 14, since the addition effects a displacement of dishwashing fluid 5 from the first tank section 6 into the second tank section 8 and thus an inflow of dishwashing fluid 5 into the receiving area 2 and/or the pump sump 14. The outlet valve 25 of the tank assembly 4 is opened at this time (FIG. 8). The second tank section 8 preferably remains empty during the rinse aid step and as a result acts as thermal insulation between the first tank section 6 and the wall 11 of the washing container.

Figure 9:
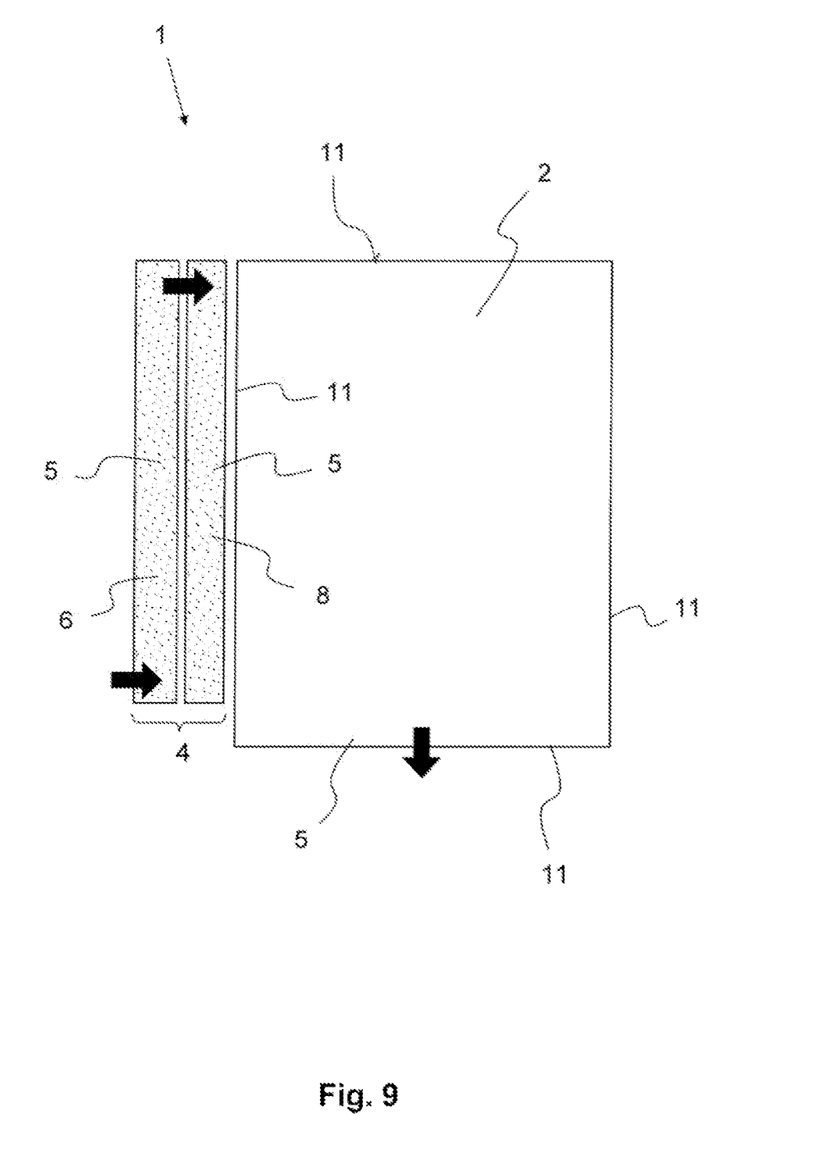

After the completion of the rinse aid step (the heat pump arrangement is also at least partially operated here) the dishwashing fluid 5 is drained out of the receiving area 2 and/or pump sump 14 (FIG. 9). At the same time, by the addition of fresh water into the first tank section 6 the second tank section 8 is—preferably entirely—filled, wherein the outlet valve 25 in this case is closed. The second tank section 8 filled with dishwashing fluid is thereby thermally conductive between the first tank section 6 and the wall 11 of the washing container facing the tank assembly 4. Since the dishwashing fluid 5 overflowing into the second tank section 8 has been substantially cooled by the operation of the heat pump arrangement, which has been previously carried out and which possibly also takes place during the drying step, it leads to a condensation of steam inside the receiving area 2 on the wall 11 adjacent to the second tank section 8 and thus to the desired drying of air in the receiving area 2. As a result, the desired drying of the items to be washed 3 finally takes place so that the washing program may be completed.

Moreover, the invention is not limited to the exemplary embodiment shown. Instead, all of the combinations of the described individual features, as they have been shown or described in the claims, the description and the figures, and if a corresponding combination appears technically possible and/or expedient, form the subject matter of the invention.

The invention claimed is:

1. A household dishwasher, comprising:
a receiving area for receiving an item to be washed; and
a tank assembly receiving dishwashing fluid, said tank assembly including a first tank section with an inlet, via which the tank assembly is suppliable with dishwashing fluid, and a second tank section with an outlet, via which dishwashing fluid in the tank assembly is able to exit the tank assembly, said first and second tank sections being fluidically connected together and arranged fluidically in series such that dishwashing fluid in the first tank section is displaced into the second tank section when additional dishwashing fluid is introduced into the first tank section via the inlet,
wherein the second tank section is at least partially arranged between the first tank section and the receiving area.

2. The household dishwasher of claim 1, further comprising a heat pump arrangement which is flowed through by a heat transfer medium during operation, said heat pump arrangement including an evaporator configured to transfer heat from the dishwashing fluid to the heat transfer medium, said evaporator being arranged, at least partially, inside the first tank section or placed in thermally conductive contact with the first tank section.

3. The household dishwasher of claim 1, further comprising a wall which defines the receiving area, said tank assembly including a wall which defines the second tank section, said wall of the tank assembly arranged in one of three ways, a first way in which the wall of the tank assembly bears directly against a receiving-area-remote side of the wall which defines the receiving area, a second way in which the wall of the tank assembly bears against a damping layer which is in contact with the wall which defines the receiving area, a third way in which the wall of the tank assembly entirely or partially forms the wall which defines the receiving area.

4. The household dishwasher of claim 1, wherein the first and second tank sections are arranged on a same side of the receiving area.

5. The household dishwasher of claim 1, wherein the first and second tank sections are fluidically connected together via a connection, with dishwashing fluid capable of flowing via the connection from the first tank section into the second tank section.

6. The household dishwasher of claim 5, wherein the connection is arranged, as viewed in a vertical direction, at a level which is higher than at least one of the inlet of the first tank section and the outlet of the second tank section.

7. The household dishwasher of claim 1, wherein the first and second tank sections are partially defined by a common wall.

8. The household dishwasher of claim 1, wherein at least one member selected from the group consisting of the first tank section and the second tank section has a pressure compensation opening via which air is able to flow into the member.

9. A method for operating a household dishwasher having a receiving area for receiving an item to be washed, comprising supplying one tank section of a tank assembly with dishwashing fluid during defined stages of a washing program by displacing dishwashing fluid in another tank section by further dishwashing fluid which flows via an inlet into the other tank section, thereby causing the dishwashing fluid displaced from the other tank section to flow into the one tank section, wherein the one tank section is at least partially arranged between the other tank section and the receiving area.

10. The method of claim 9, further comprising heating the dishwashing fluid during at least one stage of the washing program, wherein the one tank section is at least temporarily only partially filled or not filled with dishwashing fluid, when the dishwashing fluid is heated during the at least one stage of the washing program.

11. The method of claim 9, further comprising drying an item to be washed during at least one stage of the washing program, wherein the one tank section is at least temporarily entirely or partially filled with dishwashing fluid, when the item to be washed is dried during the at least one stage of the washing program.

12. The method of claim 9, further comprising allowing dishwashing fluid flowing out of the one tank section to flow into the receiving area or a pump sump of the household dishwasher, when the one tank section is emptied.

13. The method of claim 9, further comprising filling both the one tank section and the other tank section with dishwashing fluid at an end of a washing program.

* * * * *